United States Patent [19]

Leichle

[11] 4,239,024
[45] Dec. 16, 1980

[54] FAIL-SAFE IGNITION COIL DWELL CONTROL SYSTEM FOR AN INTERNAL COMBUSTION ENGINE

[75] Inventor: Claude Lèichlé, Le Pecq, France

[73] Assignee: Regie Nationale des Usines Renault, Boulogne-Billancourt, France

[21] Appl. No.: 2,025

[22] Filed: Jan. 9, 1979

[30] Foreign Application Priority Data

Jan. 9, 1978 [FR] France .................................. 78 00381

[51] Int. Cl.³ .............................................. F02P 5/04
[52] U.S. Cl. .................................... 123/416; 123/609
[58] Field of Search ............ 123/117 D, 117 R, 148 E, 123/32 EK

[56] References Cited

U.S. PATENT DOCUMENTS

| | | | |
|---|---|---|---|
| 4,068,631 | 1/1978 | Lombard et al. ................ | 123/117 D |
| 4,099,495 | 7/1978 | Kiencke et al. ............ | 123/32 EK X |
| 4,102,310 | 7/1978 | Caron ................................ | 123/117 R |

Primary Examiner—Tony M. Argenbright
Attorney, Agent, or Firm—Oblon, Fisher, Spivak, McClelland & Maier

[57] ABSTRACT

A fail-safe coil ingition dwell control system for an internal combustion engine of the type employing a digital ignition advance computer, wherein the computer computes ignition advance angle data and stores current dwell data. The fail-safe system detects the absence of an ignition spark, as may be caused by a computer failure, and in the event thereof produces a control signal capable of triggering the engine power element, i.e. spark plug, and includes an output switching circuit at the output thereof for switching control of the triggering of the engine power element from the computer to the signal generator circuit in the event of a computer failure.

6 Claims, 4 Drawing Figures

FAIL-SAFE IGNITION COIL DWELL CONTROL SYSTEM FOR AN INTERNAL COMBUSTION ENGINE

BACKGROUND OF THE INVENTION

1. Field of the Invention

The subject invention relates to a coil ignition dwell control system and to an associated fail-safe system in combination with a digital ignition advance computer.

2. Description of the Prior Art

Electronic ignition advance devices for internal combustion engines are becoming increasingly sophisticated and make use of very powerful computers. That is why the concept of controlling not only ignition advance but also the duration of current flow in the ignition coil can be applied without introducing significant complexity.

However, the devices that have been used up to now to perform this function present several drawbacks. In fact, handling the calculation of the moment of current initiation in the coil in the same manner as the moment of interruption (which, in fact, corresponds to the spark), i.e., computing this moment as a function of engine speed and of total conduction time required, makes it necessary to double certain functions in relation to the ignition advance computation itself, such as the measure of speed. The latter is generally performed at two levels, on the one hand for the calculation of the advance angle proper, and on the other hand for the conversion to engine angle of the time determined for coil control.

Furthermore, this calculation becomes more complicated as the relation between coil ignition dwell and speed diverges from a constant value. Indeed, it may be advantageous to lengthen the duration artificially for very low speeds in order to insure trouble-free starting of the engine.

Another drawback of systems now in use is that they do not provide a fail-safe device to insure advance to dead center in case of computer failure.

SUMMARY OF THE INVENTION

Accordingly, it is one object of this invention to provide a novel fail-safe system in a dwell control system in the ignition coil of an internal combustion engine, which overcomes the drawbacks of the prior art devices and which makes use of the circuit elements for the determination of the angle of ignition advance to deduce simultaneously the moment of conduction initiation in the ignition coil. As a result only a minimum of additional equipment is used, and this equipment occupies but little space on an integrated circuit chip.

Another object of this invention is to provide such a novel system which anticipates both the interruption and the initiation of the current in the coil, it being noted that safety in regard to the interruption is meaningful only if the initiation has been assured.

These and other objects are achieved according to the invention by providing a fail-safe system associated with a dwell control system for the ignition coil of an internal combustion engine, in particular for automotive vehicles, wherein the engine includes an electronic induction coil control circuit in which is subtracted an angular reference signal. The electronic induction coil control circuit includes a power element, current collectors placed in predetermined angular positions around a rotating element driven by the engine and coordinated by spotting means carried by the rotating element, and a digital computer associated with a read-only memory in which are stored constant coefficients that permit the calculation of data indicative of the ignition advance angle $A_v$ for each half-turn of the crankshaft in the case of a 4-stroke, 4-cylinder engine and a synchronization signal SY generator at each half-turn of the engine, the computer generating a first control signal at a predetermined instant to trigger the power element of the induction coil control circuit. The fail-safe device includes the read-only memory additionally storing current conduction time duration data related to a predetermined operation of the electronic induction coil control circuit; means coupled to the ignition advance angle $A_v$ data and the current conduction time duration data for detecting the absence of ignition spark emission; signal generator means for generating in the event of the detection of an absence of ignition spark a second control signal capable of triggering the power elements; and, output switching means coupled to the detecting means, the computer and the signal generator means for switching the control of the triggering of the power element from the first control signal to the second control signal in the event of a computer failure.

Advantageously, the fail-safe system in accordance with subject invention, includes a counter circuit connected to the outputs of the read-only memory, and having output terminals which provide the result of the ignition advance angle calculation, a correcting circuit taking into account the correction factors, and a subtractor whose input terminals are connected, on the one hand, to the output terminals of the counter and, on the other hand, to the synchronization signal generator, and finally to an angular reference pulse generator. The system further includes a computer circuit connected by a first series of input terminals to the output terminals of the read-only memory providing the information $AT_c$ concerning time duration for the ignition timing control, and by a second series of input terminals to the output terminals of the subtractor.

In accordance with a first embodiment characteristic, the fail-safe system in accordance with the subject invention comprises a R-S flip-flop whose "one" setting input terminal is connected to the output terminal of the comparator, and whose "zero" resetting input terminal is connected to the output terminal of a logic OR gate whose input terminals are connected, on the one hand, to the "zero crossover" output terminal of the subtractor and, on the other hand, to the synchronization signal SY generator, and whose output terminal is connected on the one hand, to the output switching system and, on the other hand, to the means for detecting the absence of ignition spark emission.

In accordance with a second embodiment characteristic, the means for detecting the absence of ignition spark emission comprises a first D flip-flop whose clock input terminal is connected to the synchronization signal SY generator and whose zero resetting input terminal is connected to the output terminal of the R-S flip-flop through the intermediary of a first monostable flip-flop.

In accordance with a third embodiment characteristic, the signal generator in case of failure includes a second monostable flip-flop whose input terminal is connected to the output terminal of a logic AND gate whose input terminals are connected, on the one hand, to the synchronization signal SY generator and, on the other hand, to the non-inverting output terminal of the first D flip-flop, the second monostable flip-flop having a non-inverting output terminal connected to the clock input terminal of a second D flip-flop.

In accordance with a fourth embodiment characteristic, the output switching system includes a set of logic AND gates, logic OR gates and invertors whose first input terminal is connected to the inverting output terminal of the second monostable flip-flop, and whose second input terminal is connected to the output terminal of the R-S flip-flop, and whose third input terminal is connected to the non-inverting output terminal of the second D flip-flop.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
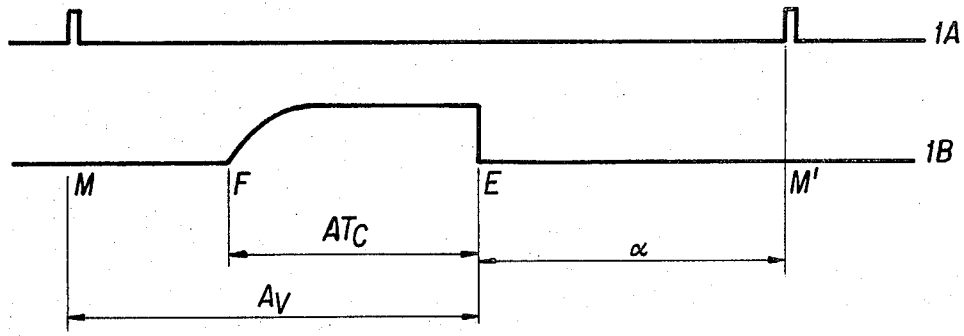
FIG. 1 is a timing diagram illustrating the problem solved by the present invention.

Referring now to the drawings, wherein like reference numerals designate identical or corresponding parts throughout the several views, and more particularly to FIG. 1 thereof, the line 1A represents the dead center signal of the engine, i.e., points M and M'. Line 1B represents the current in the ignition coil: point F for current initiation, point E for interruption, i.e., spark; $\alpha$ is the angle of ignition advance; and $T_c$ represents the duration of current flow through the coil. In actual fact, two angles are significant and are shown in the figure: angle $A_v$ which is the actual computation result since there cannot be anticipation by the computer, and angle $AT_c$ which corresponds to coil ignition dwell.

The device is designed to operate in combination with an ignition advance computer as described in BF No. 75/30 902. This computer functions in accordance with a principle which is recalled here briefly so that the rest of this presentation can be better understood; the calculation uses the equation:

$$A_v = A(f) + \beta(\omega)(P - Po) + C \cdot T$$

where:

$A_v$ is the result of computation, i.e., proportional to angle C of FIG. 1.

$A(\omega)$ is any function of engine speed, a term that is read in a read-only memory.

$\beta(\omega)$ is the speed factor of the pressure correction; it is also read in the read-only memory.

$(P - Po)$ is a term that is proportional to absolute pressure at intake.

C is the temperature correction factor.

T is a term which is a function of engine temperature.

Figure 2:
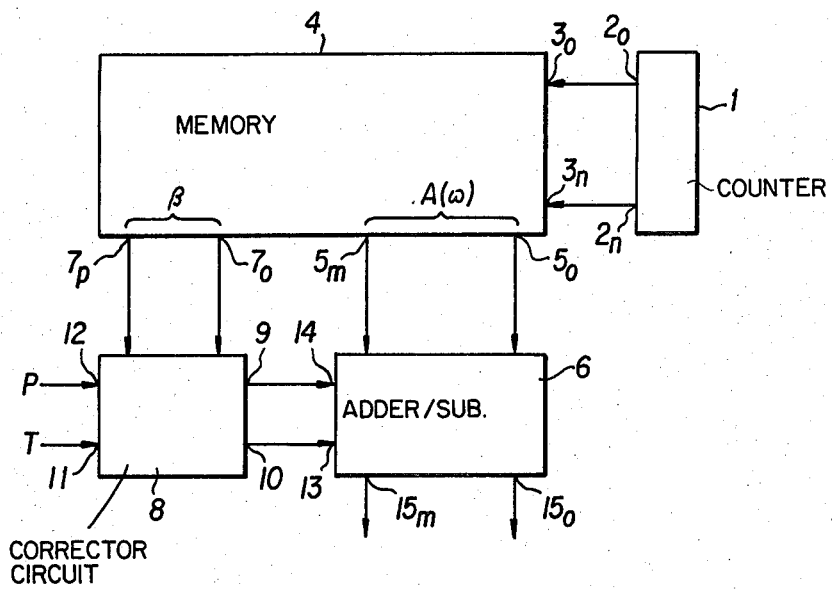
FIG. 2 is a schematic circuit diagram of a prior art device which insures ignition by subtraction of an angular reference signal.

FIG. 2 is a schematic circuit representation of the prior art device. A counter 1 measures engine speed so that the latter is present upon its output terminals $2o$ to $2_n$ and is applied to the addressable input terminals $3o$ to $3_n$ of a memory 4. This memory includes two sets of output terminals: $5o$ to $5_m$ upon which the number $A(\omega)$ is present, corresponding to the speed posted in counter circuit 1, which number $A(\omega)$ is applied to the preselection input terminals of an adder-subtractor 6; and $7o$ to $7_p$ upon which input terminals is present a number $\beta$ applied to a generating corrector circuit 8, on the one hand, upon its output terminal 9 the pulses corresponding to the difference between $A_v$ and $A(\omega)$ and, on the other hand, upon its output terminal 10 the sign of that difference.

More detailed information on this corrector circuit 8 can be found in the patent cited in reference. It should be noted that this circuit 8 receives the data on terms P and T through its input terminals 12 and 11. The output terminal 10 of this circuit 8 indicates the sign of the correction term to be applied to $A(\omega)$ in order to obtain $A_v$, and is connected to the adding-subtracting control input terminal 13 of the adder-subtractor 6.

Operation of the unit is simple: when the engine speed is determined, it is posted upon the input terminals of memory 4 which applies at its output terminals the corresponding numbers $A(\omega)$ and $\beta$ respectively to circuits 6 and 8. Thus, the adder-subtractor can be loaded with the value of $A(\omega)$ and the correcting circuit 8 generates the number of correction pulses, which are added or subtracted depending on the sign posted at 10. The result of the calculation, i.e., the number $A_v$ is present upon the output terminals $15o$ to $15_m$ of adder 6.

This having been recalled, the principle underlying the ignition coil current control device in accordance with the present invention can now be stated. Since the number $A(\omega)$ is entered in memory at every position as a function of speed, the memory can also post the number $AT_c$ which is the angle corresponding to the time $T_c$ of current flow through the coil. Passage from time to angle is simple since each value of $A(\omega)$ applies to only one specific speed.

Thus, the value of $AT_c$ is entered into the memory, which is actually not much larger than that of the device for ignition advance alone.

At the output terminal, the number $A_v$ is subtracted as it is in all known devices. The ignition coil is triggered when the content of this subtractor becomes equal to the value posted upon the memory's output terminal, i.e., $AT_c$. The system of the invention is extremely simple and comprises only very few additional circuits. As a matter of fact, in an integrated circuit memory, expansion requires but little space inasmuch as there is no need for supplementary decoding.

The present invention also results in a fail-safe system. Two types of failure can occur in the computer. The first is a failure in the current interruption circuit. Such a failure, which was already possible in circuits that do not control induction dwell, is readily detected: if at the instant of the signal for dead center, the coil has not been cut, the interruption is imposed. This type of system is described in French Pat. No. 75/30 902. The other type of failure, which the subject invention is desinged to correct, is that of the coil current initiation circuit; in such a case, the above prior art fail-safe system is inoperative.

The process followed by subject invention is the following: at each synchronization pulse SY, the device examines whether conduction initiation has occured in the ignition coil. If so, nothing happens and the system remains inactive. If not, the system activates the coil in a permanent manner and interrupts the current for a constant time duration after dead center by the operation of a monostable flip-flop. It is also possible to observe a spark at each dead center signal, only one spark having been lost, which does not cause the engine to stop. Another advantage of the system is that it is entirely independent of the computer. Consequently, the mere presence of the half-turn signal is enough to generate a spark.

Figure 3:
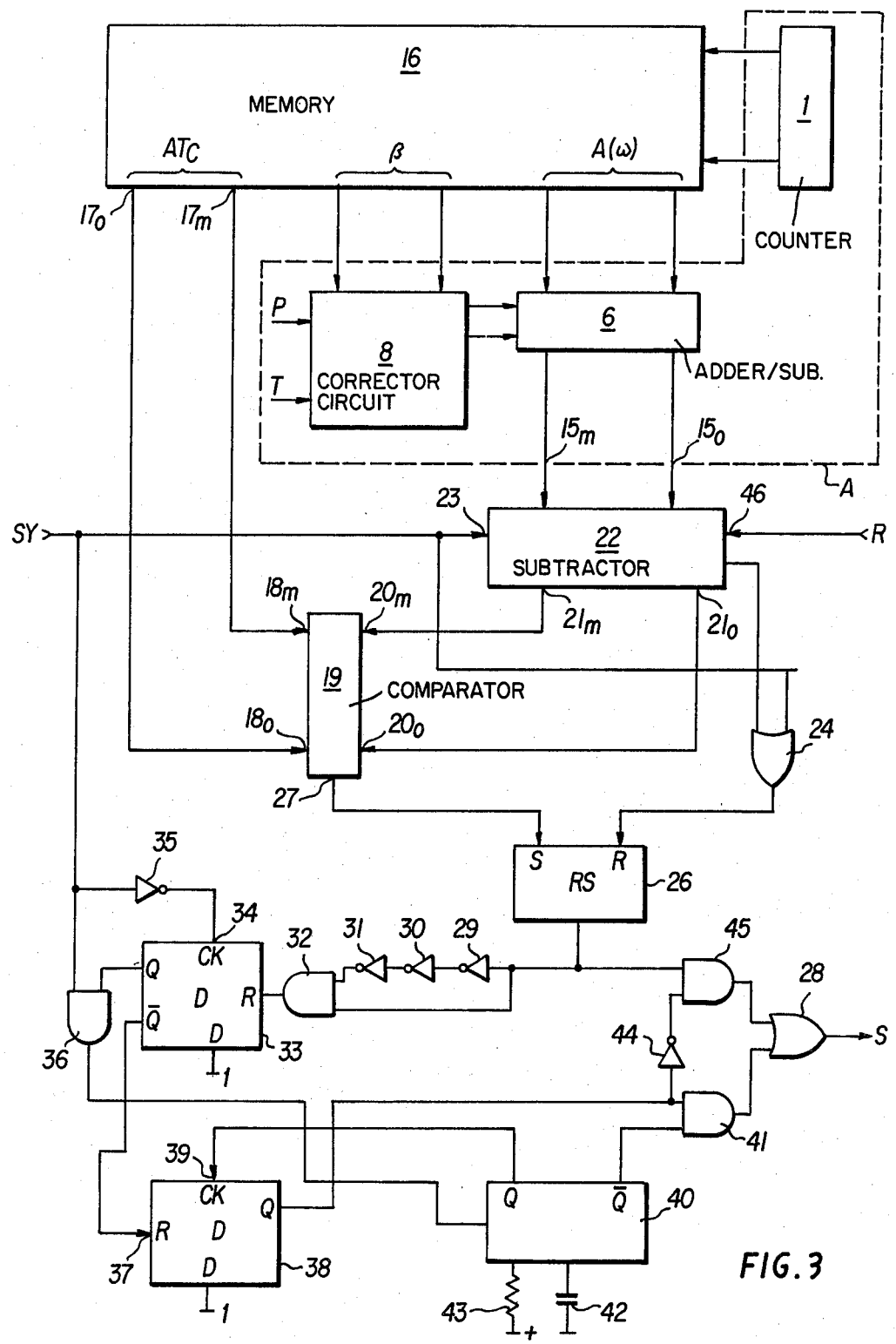
FIG. 3 is a schematic circuit diagram of the present invention.

FIG. 3 represents one embodiment of the fail-safe system that constitutes the present invention. Part A is in fact taken from the advance calculation device of the system described in pat. No. 75/30 902 cited above and represented in FIG. 2. It comprises the same elements: counter 1, comparator 8, counter 6. This counter has the output terminals 15o to $15_m$ upon which is present the result of the ignition advance angle computation. Memory 16 is identical with memory 4 of FIG. 2, except that the capacity has been increased so it can contain the additional word $AT_c$ upon its output terminals 17o and $17_m$. The addressing of the memory by counter 1 remains the same.

The output signals 17o to $17_m$ are applied to input terminals 18o to $18_m$ of a comparator 19. This comparator has another set of input terminals 20o to $20_m$ which are connected to output terminals 21o to $21_m$ of a subtractor 22. The latter receives upon its preselection input terminals the computation results posted upon output terminals 15o to $15_m$ of counter 6.

The loading input terminal of subtractor 22 is connected to the input lead of the system, to which is applied the synchronization signal SY (signal that occurs at every half-turn of the engine). This signal is also applied to one of the input terminals of OR gate 24 whose other input terminal is connected to the "zero crossover" output terminal 25 of subtractor 22. The clock input terminal 46 of this same subtractor is connected to the source of the angular reference signal R. An R-S flip-flop receives upon its zero-setting input terminal R the output signal of OR gate 24 and at its "resetting to one" input terminal S the signal from the "coincidence" output terminal 27 of comparator 19. The signal from flip-flop output terminal 26 is applied, on the one hand, to AND gate 45 and, on the other hand, to a set of gates constituted by a chain of three inverters in series 29,30,31 and AND gate 32. The output of gate 32 is connected to the zero-resetting input terminal of D flip-flop 33. This flip-flop 33 is connected in the following manner: its D input terminal is maintained at the "one" level; its clock input terminal 34 receives the synchronization signal SY by means of an inverter 25; its output terminal Q is connected to the input terminal AND gate 36, the other input terminal of this AND gate being connected to the signal SY source; and its output terminal $\overline{Q}$ is connected to the zero-resetting input terminal 37 of another D flip-flop 38. This flip-flop is connected in such a manner that its input terminal D is permanently at "one"; its clock input terminal 39 is connected to the output terminal Q of monostable flip-flop 40, and its output terminal Q is connected to the input terminal of inverter 44 and to one of the input terminals of AND gate 41 whose other input terminal is connected to the output terminal Q of monostable flip-flop 40. The input terminal of flip-flop 40 is connected to the output terminal of gate 36, and the delay is set by capacitor 42 and a resistor 43. The output terminal of gate 41 is connected to one of the input terminals of OR gate 28 whose output terminal forms the output terminal of the device and is connected directly to the power element that controls the ignition coil. The other input terminal of gate 28 is connected to the output terminal of gate 45. Inverter 44 feeds its signal to the second input terminal of gate 45.

Figure 4:
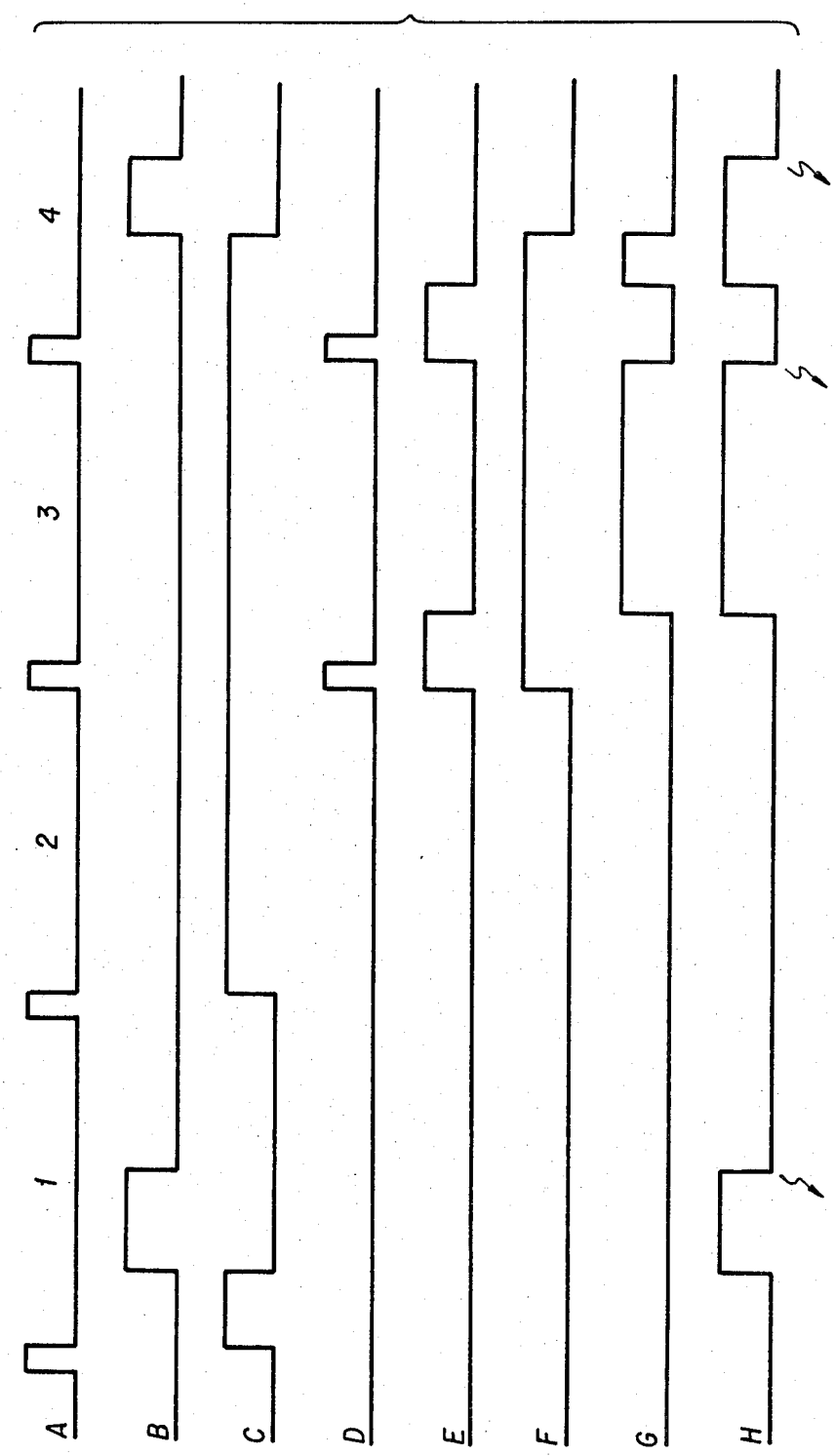
FIG. 4 is a timing diagram of various signals present in the system shown in FIG. 3.

FIG. 4 represents a timing diagram for signals produced by the circuits shown in FIG. 3. Thus, signal 4 A is a signal SY, signal 4 B is the output signal of R-S flip-flop 26, signal C is the output signal Q of flip-flop 33, signal D is the one posted at the output terminal of AND gate 36, signal E is found upon the output terminal Q of monostable flip-flop 40, and signal F occurs upon the output terminal Q of flip-flop 38. Signal G is applied to the output terminal of AND gate 41 and signal H, finally, is the output of OR gate 28 and, thus, of the entire system.

The system operates as follows. The computation cycle explained in the French patent cited in reference leads, on the one hand, to posting the speed value at the addressable input terminal of the memory and, on the other hand, to posting the calculation result (value of angle $A_v$ of FIG. 1). These two postings involve the computer itself and are described in detail in the referenced patent. Thus, the supplementary component of the memory permanently has present upon its output terminals 17o to $17_m$ the value of angle $AT_c$ of FIG. 1, i.e., the value of the angle during which the coil must be traversed by a current. When pulse SY is applied, the value of $A_v$ (FIG. 1) is transmitted to subtractor 22 which subtracts the angular reference pulses R provided upon input lead 46. When the value in subtractor 22 reaches the value of $AT_c$, comparator 19 provides a pulse at 27 which sets flip-flop 26 to "one". When subtractor 22 passes zero or, failing that, at the following SY pulse, gate 24 generates a pulse which sets flip-flop 26 to zero. Thus, there occurs upon the output terminal of flip-flop 26 an identical signal to that of FIG. 4 B. This figure presents four phases that are consecutive in time. They correspond to four consecutive half-turns of the engine. The figure shows successively a phase without failure, two phases during which the computer does not initiate any ignition coil current, and then another phase without failure. A phase is said to be without failure if the command for initiating the current is given and if this current is interrupted either at the calculated instant or by the following SY signal through the operation of gate 24.

As has been explained, the system of the invention will generate a spark whenever it is not initiated by the computer itself. As a matter of fact, D flip-flop 33 is set to "one" by each descending edge of signal SY and is set to "zero" by the interruption of the current in the coil, which is achieved by the monostable circuit formed by gates 29 to 32. Thus, if a spark is not produced, as in phase 2 of FIG. 4, D flip-flop 33 is at "one" at the instant when signal SY occurs after this phase. The output signal of this flip-flop is represented in FIG. 4 C. Thus, upon the output terminal of gate 36, SY pulses occur immediately after the phase without spark (FIG. 4 D); these signals trigger monostable flip-flop 40 whose output signal is represented by line E in FIG. 4 and which is in the "one" state during the time duration when the coil must be non-conducting. A supplementary logic formed by flip-flop 38 and gates 41 and 28 permits passage to output terminal S either of the calculated signal emitted by flip-flop 26 or, in case of failure, of the signal from monostable flip-flop 40. This is achieved by locking flip-flop 38 at the first pulse emitted by the monostable flip-flop 40 which actually corresponds to the start of the failure, and by resetting it to "zero" when flip-flop 33 springs back, i.e., at the end of the failure. The signal emitted by flip-flop 38, shown in FIG. 4 F, thus represents what might be dubbed "failure in progress". When this signal is at zero, gate 41 is blocked and gate 45 is opened by inverter 44. Thus, the signal emitted by flip-flop 26 is applied to S. When the signal emitted by flip-flop 38 is at "one", i.e., in the case of failure, gate 45 is blocked and gate 41 transmits the signal from monostable flip-flop 40 through gate 28 to output lead S. There exists a procedure in case of failure which is shown in line H of FIG. 4. When the computer again generates a signal (phase 4), flip-flop 33 is reset to "zero", which resets flip-flop 38 to "zero" and again allows the transmission to output lead S of the calculated signal emitted by flip-flop 26.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A fail-safe ignition coil dwell control system for internal combustion engine, in particular for automotive vehicles, said engine provided with an electronic induction coil control circuit in which is subtracted an angular reference signal and which includes a power element, current collectors placed in predetermined angular positions around a rotating element driven by the engine and coordinated by spotting means carried by the rotating element, and a digital computer associated with a read-only memory in which are stored constant coefficients that permit the calculation of data indicative of the ignition advance angle $A_v$ for each half-turn of the crankshaft in the case of a 4-stroke, 4-cylinder engine and a synchronization signal generator for generating a synchronization signal SY at each half-turn of the engine, said computer generating a first control signal at a predetermined instant to trigger the power element of said induction coil control circuit, comprising:

the read-only memory additionally storing current conduction time duration data related to a predetermined operation of said electronic induction coil control circuit;

means coupled to the ignition advance angle $A_v$ data and the current conduction time duration data stored in said read-only memory for detecting the absence of ignition spark emission based upon a comparison of the value of $A_v$ data and current conduction time duration data developed during each half-turn of the engine;

signal generator means coupled to said detecting means for generating in the event of the detection of an absence of ignition spark a second control signal capable of triggering the power element; and output switching means coupled to said detecting means, said computer and said signal generator means for switching the control of the triggering of the power element from said first control signal to said second control signal;

whereby the maintenance of ignition spark emission is maintained even in the event of a computer failure.

2. A fail-safe system according to claim 1, further comprising:

a correcting circuit coupled to a first set of outputs from said read-only memory for taking into account the plural correction factors in an advance angle calculation;

a adder-subtractor circuit coupled to a second set of outputs from said read-only memory and said correcting circuit, for executing the advance angle calculation and generating an output indicative thereof;

a subtractor circuit having input terminals connected, on the one hand, to the output of said adder-subtractor circuit and, on the other hand, to said synchronization signal SY generator and to a generator of angular reference pulses, said subtractor having loaded therein the result of the advance angle calculation upon the occurance of each synchronization signal SY and deincrementing the result of the advance angle calculation upon the application thereto of each angular reference pulse;

a comparative circuit having a first set of inputs connected to a third set of output terminals of said read-only memory indicative of coil ignition dwell, and a second set of inputs connected to the output of said subtractor circuit, said comparator circuit producing an output when the signals applied to the first and second set of inputs thereof are equal.

3. A fail-safe system according to claim 2, further comprising:

a logic OR gate having a first input connected to said synchronization signal SY generator and a second input connected to a second output of a subtractor indicative of the fact that the advance angle calculation has been deincremented to zero, said OR gate producing an output; and an R-S flip-flop having a set input connected to the output of said comparator and a reset input connected to the output of said OR gate, said R-S flip-flop generating an output connected, on the one hand to said output switching means, and on the other hand, to said means for detecting the absence of ignition spark emission.

4. A fail-safe device according to claim 3, wherein said means for detecting the absence of ignition spark emission comprises:

a first monostable flip-flop connected to the output of said R-S flip-flop; and a first D flip-flop having a clock input connected to the synchronization signal SY generator and having a reset input connected to the output of the R-S flip-flop through the intermediary of said first monostable flip-flop.

5. A fail-safe system according to claim 4, wherein said signal generator means comprises:

a logic AND gate having a first input connected to the synchronization signal SY generator and a second input connected to a non-inverting output terminal of said first D flip-flop, said AND gate generating an output;

a second monostable flip-flop having an input connected to the output of said AND gate, and producing an inverting output switching means; and, a second D flip-flop having a clock input connected to the non-inverting output of said second monostable flip-flop, said second D flip-flop generating a non-inverting output connected to said output switching means.

6. A fail-safe system according to claim 5, wherein said output switching means comprises:
- an inverter connected to the non-inverting output of said second D flip-flop, said inverter producing an output;
- a first AND gate having a first input connected to the output of said R-S flip-flop and a second input connected to the output of said inverter, said first AND gate producing an output;
- a second AND gate having a first input connected to the non-inverting output of said second D flip-flop, and a second input connected to the inverting output of said second monostable flip-flop, said AND gate producing an output; and,
- a second OR gate having a first input connected to the output of said first AND gate, and a second input connected to the output of said second AND gate, said OR gate producing an output control signal for triggering the power element of said electronic induction coil control circuit.

* * * * *